US012589722B2

(12) United States Patent
Hurley et al.

(10) Patent No.:    US 12,589,722 B2
(45) Date of Patent:        Mar. 31, 2026

(54) SERVICE BRAKE CONTROL SYSTEM FOR A COMBINATION VEHICLE

(71) Applicant: Bendix Commercial Vehicle Systems LLC, Avon, OH (US)

(72) Inventors: Ryan S. Hurley, Lakewood, OH (US); John V. Ripley, Elyria, OH (US); Randy J. Salvatora, Columbia Station, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 407 days.

(21) Appl. No.: 18/509,615

(22) Filed: Nov. 15, 2023

(65) Prior Publication Data

US 2025/0153695 A1      May 15, 2025

(51) Int. Cl.
*B60T 13/66*          (2006.01)
*B60T 13/68*          (2006.01)

(52) U.S. Cl.
CPC .......... *B60T 13/665* (2013.01); *B60T 13/683* (2013.01)

(58) Field of Classification Search
CPC ............................. B60T 13/665; B60T 13/683
USPC ............................................................. 303/7
See application file for complete search history.

(56) References Cited

U.S. PATENT DOCUMENTS 5,615,929 A * 4/1997 Broome ................... B60T 13/66
303/3
10,850,716 B2 * 12/2020 Salvatora ................ B60T 8/321

10,933,852 B2 * 3/2021 Goers ................... B60T 15/028
12,263,821 B2 * 4/2025 van Thiel ................ B60T 8/171
2024/0140384 A1 * 5/2024 van Thiel ................ B60T 17/22
2025/0145123 A1 * 5/2025 Hurley ................... B60T 8/361

FOREIGN PATENT DOCUMENTS

DE         102008007877 B3 * 11/2009 ............ B60T 13/683
WO         2011/003491 A1      1/2011

OTHER PUBLICATIONS

English (machine) translation of WO 2011/003491 A1.
Meritor, Inc. "Maintenance Manual MM-0888 RSSplusTM Trailer ABS With Roll Stability Support 2S/2M and 4S/2M" (2012).

* cited by examiner

*Primary Examiner* — Christopher P Schwartz
(74) *Attorney, Agent, or Firm* — Reising Ethington P.C.

(57)                        ABSTRACT

A service brake control system for a combination vehicle including a towing member and first and second towed members includes an electro-pneumatic brake control valve on the first towed member that delivers fluid pressure through a delivery port in response to an electronic control signal that is generated by a brake controller on the towing member. A double check valve includes a first supply port in fluid communication with a forward fluid coupling on the first towed member that delivers a first fluid control signal from the towing member, a second supply port in fluid communication with the delivery port of the electro-pneumatic brake control valve and a delivery port in fluid communication with a rear fluid coupling on the first towed member that delivers a second fluid control signal from the double check valve to the second towed member.

16 Claims, 4 Drawing Sheets

SERVICE BRAKE CONTROL SYSTEM FOR A COMBINATION VEHICLE

BACKGROUND OF THE INVENTION a. Field of the Invention

This disclosure relates to vehicle braking systems. In particular, this disclosure relates to a system for controlling wheel brakes in members of a combination vehicle lacking an electronic braking system that enables accelerated application and release of the wheel brakes in those members.

b. Background Art

A combination vehicle includes a powered towing member and one or more towed members such as trailers, semi-trailers and dollies. Combination vehicles will frequently include multiple towed members. Each member of the combination vehicle includes its own braking system including wheel brakes and a combination of valves that provide fluid to and exhaust fluid from the wheel brakes to apply and release the wheel brakes. Although each member of the combination vehicle has its own braking system, the braking systems on each member of the combination vehicle are least partly under common control. Fluid and/or electrical control signals may be passed from the towing member of the combination vehicle to each of the towed members of the combination vehicle (e.g., when an operator in the towing member or an automated braking system on the towing member configured to implement functions such as automated emergency braking (AEB), anti-lock braking (ABS), collision avoidance, adaptive cruise control, traction control or stability control requests application of the wheel brakes for service braking).

A growing number of newer vehicles, and towing and towed members of combination vehicles, are replacing conventional fluid-controlled braking systems with electronic-over-air braking systems (herein referred to as an electronic braking systems) in which electronic control signals control delivery of fluid pressure. As compared to fluid-controlled braking systems, electronic braking systems offer several advantages. Electronic braking systems shorten the response time between a brake command and application of the brakes because electrical control signals travel faster than fluid control signals. Electronic braking systems also allow more accurate control of brake pressure due to the use of pressure sensors and other feedback systems. Electronic brake systems also allow brake pressure to be set independently of the position of operator controls such as brake pedals.

Although electronic braking systems offer a number of advantages relative to fluid-controlled braking systems, many vehicles, and members of combination vehicles, are still being manufactured with fluid-controlled braking systems. In addition, many existing vehicles, and members of combination vehicles, with fluid-controlled braking systems are likely to remain in operation for many years. In the case of a combination vehicle with many members, therefore, the vehicle may include members that have electronic braking systems and members that do not and that must rely on the use of fluid control signals to control the wheel brakes on such members. As a result, the time between a brake command and application or release of the wheel brakes on various members of the combination vehicle may vary significantly. In addition, in a combination vehicle with many members, the impact of the slower travel time of fluid control signals is exacerbated with potentially significant delays between a command to apply or release the brakes and implementation of that command to members of the combination vehicle furthest away from the towed member.

The inventors herein have recognized a need for a service brake control system for a combination vehicle that will minimize and/or eliminate one or more of the above-identified deficiencies.

BRIEF SUMMARY OF THE INVENTION

This disclosure relates to vehicle braking systems. In particular, this disclosure relates to a system for controlling wheel brakes in members of a combination vehicle lacking an electronic braking system that enables accelerated application and release of the wheel brakes in those members.

One embodiment of a service brake control system for a combination vehicle including a towing member and first and second towed members includes an electro-pneumatic brake control valve configured for mounting on the first towed member. The electro-pneumatic brake control valve is configured to output fluid pressure from a fluid source received at a supply port on the electro-pneumatic brake control valve through a delivery port on the electro-pneumatic brake control valve responsive to an electronic control signal that is generated by a brake controller on the towing member. The system further includes a double check valve. The double check valve has a first supply port in fluid communication with a forward fluid coupling on the first towed member that is configured to deliver a first fluid control signal from the towing member to the first towed member. The double check valve has a second supply port configured for fluid communication with the first delivery port of the electro-pneumatic brake control valve. The double check valve has a delivery port in fluid communication with a rear fluid coupling on the first towed member and configured to deliver a second fluid control signal from the double check valve on the first towed member to the second towed member.

A service brake control system for a combination vehicle in accordance with the teachings disclosed herein is advantageous relative to conventional systems. In particular, the system accelerates the transmission of fluid control signals to members of the combination vehicle using conventional fluid-controlled braking systems by taking advantage of the faster electrical control signals received by members of the combination vehicle using electronic braking systems. Further, the system does so without comprising the conventional fluid-controlled operation of the fluid-controlled braking systems. As a result, the system shortens the response time between a brake command and application of the brakes on members of the combination vehicle employing fluid-controlled braking systems (particularly on towed members further away from the towing member) and enables improved synchronization in the operation of the wheel brakes on the members of the combination vehicle.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
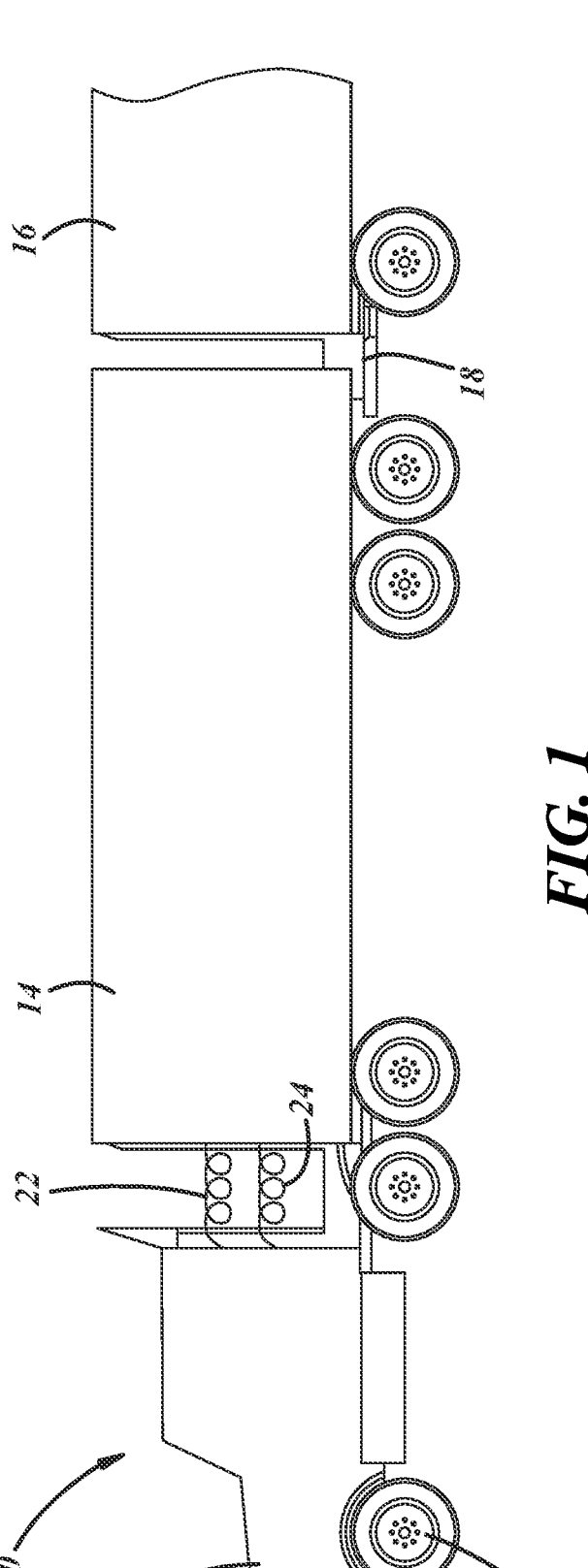
FIG. 1 is a diagrammatic view of a combination vehicle incorporating a service brake control system in accordance with the teachings set forth herein.

Referring now to the drawings wherein like reference numerals are used to identify identical components in the various views, FIG. 1 illustrates a combination vehicle 10. In the illustrated embodiment, vehicle 10 comprises a heavy commercial vehicle and, in particular, a tractor-trailer. It should be understood, however, that the systems disclosed herein may find application on other types of combination vehicles including non-commercial vehicles. Vehicle 10 includes multiple members including a towing member such as tractor 12 and multiple towed members such as semi-trailers 14, 16 and a dolly 18 coupling semi-trailers 14, 16.

Tractor 12 provides power for moving semi-trailers 14, 16 and dolly 18. Tractor 12 includes steering and drive axles each of which support one or more wheels 20 at either end. Tractor 12 further includes a power unit, such as an internal combustion engine or electric motor for generating mechanical energy used to rotate wheels 20 and a battery for use in starting the power unit and for use by the power unit in generating the mechanical energy used to drive wheels 20. The battery may also provide power to various accessory systems on vehicle 10 including communication systems, lighting systems and the braking control system described hereinbelow.

Semi-trailers 14, 16 are provided to carry or store freight and are detachably coupled to tractor 12. Each semi-trailer 14, 16 is supported on one or more trailer axles, each of which may support one or more wheels 20 at either end. Although a pair of semi-trailers 14, 16 are shown in the illustrated embodiment, it should be understood that the number of semi-trailers attached to tractor 12 may vary.

Dolly 18 is provided to support semi-trailer 16 and couple semi-trailers 14, 16. Dolly 18 is supported by one or more axles, each of which may support one or more wheels 20 at either end. Although a single dolly 18 is shown in the illustrated embodiment, it should again be understood that the number of dollies attached to tractor 12 may vary.

Tractor 12, semi-trailers 14, 16 and dolly 18 are mechanically coupled for movement as a combination vehicle. Tractor 12, semi-trailers 14, 16 and dolly 18 are also connected by fluid hoses 22 and electrical conductors 24 extending between tractor 12, semi-trailers 14, 16 and dolly 18. Fluid hoses 22 allow delivery of fluid pressure and fluid control signals between tractor 12, semi-trailers 14, 16 and dolly 18 for use in, for example, tire pressure management and braking and stability control. Each fluid hose 22 may include a fluid coupling, such as a gladhand connector, at either end configured for connection with a corresponding fluid coupling, such as another gladhand connector, on one of tractor 12, semi-trailers 14, 16 or dolly 18. Electrical conductors 24 allow for transmission of power and the exchange of messages (data or commands)—including the electronic control signals discussed below—between tractor 12, semi-trailers 14, 16 and dolly 18 for use in providing power to various systems on semi-trailers 14, 16 and dolly

18, obtaining data from sensors and control systems on semi-trailers 14, 16 and dolly 18 and for controlling various systems on semi-trailers 14, 16 and dolly 18. Each electrical conductor 24 may include an electrical coupling at either end configured for connection with a corresponding electrical coupling on one of tractor 12, semi-trailers 14, 16 or dolly 18.

Figure 2:
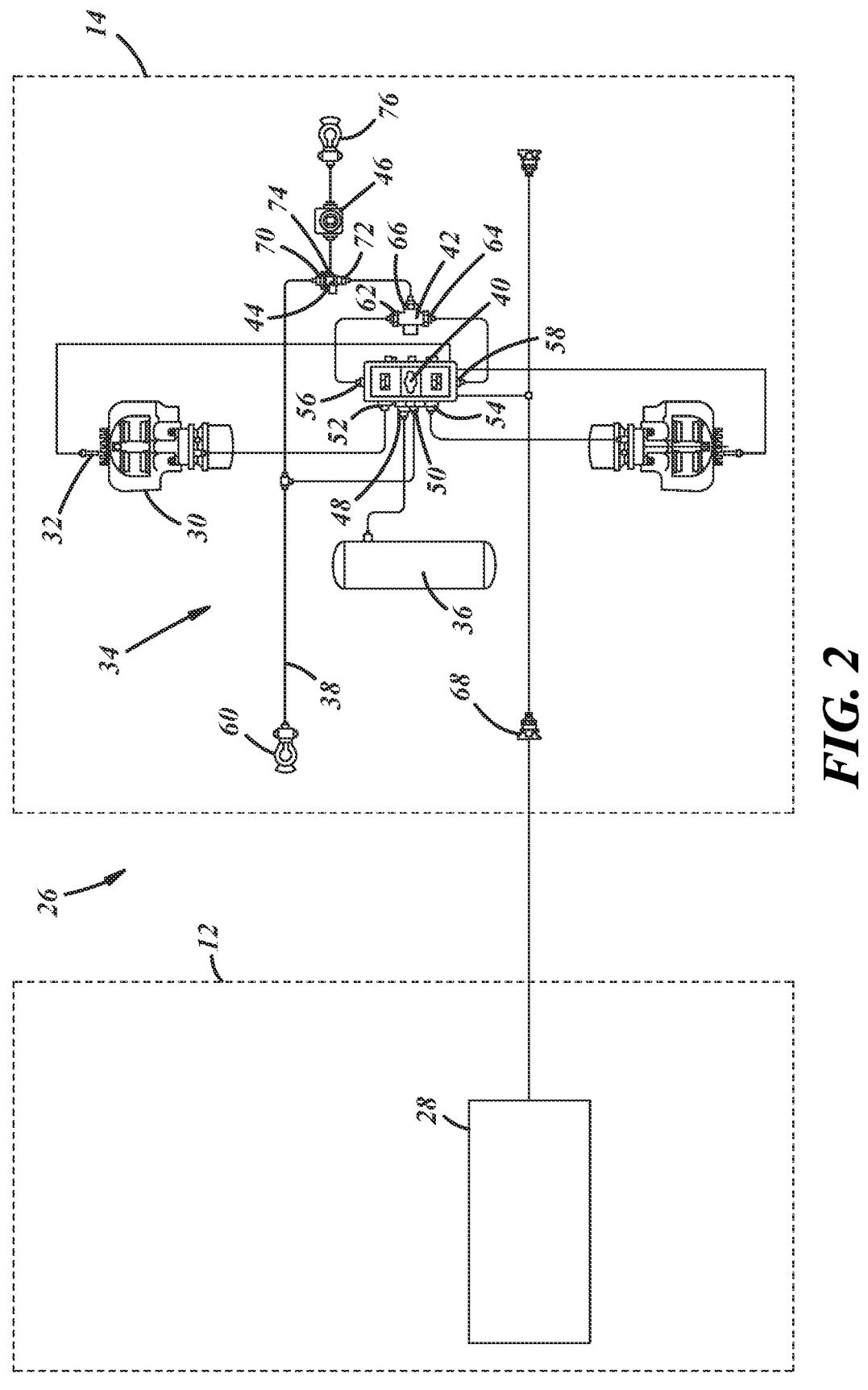
FIG. 2 is a diagrammatic view of one embodiment of a service brake control system for a combination vehicle in accordance with the teachings set forth herein.

Referring now to FIG. 2, in accordance with teachings disclosed herein, vehicle 10 includes a system 26 for controlling braking of vehicle 10 and, in particular, controlling servicing braking of vehicle 10. System 26 is configured to brake one or more wheels 20 on vehicle 10 in order to slow, stop, or prevent movement of vehicle 10. System 26 is configured to brake vehicle 10 in response to commands from an operator of vehicle 10, but may also be configured to implement autonomous braking (i.e., without commands from the operator of vehicle 10) as part of an advanced driver assistance system (ADAS) or automated driving system (ADS) in order to provide various functions such as automated emergency braking (AEB), anti-lock braking (ABS), collision avoidance, adaptive cruise control or stability control. System 26 may include a brake controller 28, wheel brakes 30, wheel speed sensors 32, and a fluid circuit 34 that provides pressurized fluid to wheel brakes 30. In accordance with the teachings herein, system 26 leverages the benefits of components from an electronic braking system on the towing member of a combination vehicle 10 and one of the towed members of vehicle 10 (semi-trailer 14 in the illustrated embodiment) to accelerate the delivery of fluid control signals to downstream members of vehicle 10 that rely solely on fluid-controlled braking systems and lack components of an electronic braking system. Therefore, in the illustrated embodiment, wheel brakes 30, wheel speed sensors 32 and fluid circuit 34 are illustrated as being located on or mounted on semi-trailer 14 and system 26 is configured to accelerate delivery of fluid control signals to semi-trailer 16 and/or dolly 18. It should be understood, however, that, although not illustrated in the drawings, each member of vehicle 10 may include at least wheel brakes for braking wheels 20 on the member and a fluid circuit configured to deliver pressurized fluid to those wheel brakes. It should also be understood that the arrangement of wheel brakes 30, wheel speed sensors 32 and fluid circuit 34 on semi-trailer 14 in the illustrated embodiment could alternatively be located on any towed member of a combination vehicle (including semi-trailer 16 or dolly 18 in vehicle 10). For example, in a vehicle including three semi-trailers and two dollies linking the semi-trailers, the arrangement could be located on the center semi-trailer and used to accelerate delivery of fluid control signals to the last (furthest downstream) semi-trailer even if the first (furthest upstream) semi-trailer employs a fluid-controlled braking system. Finally, it should also be understood that the disclosed arrangement of wheel brakes 30, wheel speed sensors 32 and fluid circuit 34 on semi-trailer 14 in the illustrated embodiment could be located on multiple towed members of a combination vehicle.

Brake controller 28 controls the operation of certain components of fluid circuit 34 in order to control the fluid pressure delivered to wheel brakes 30 and, therefore, the braking force applied to the wheels 20. In this manner, brake controller 28 may be configured to implement service braking as well as anti-lock braking (ABS), traction control and stability control when required. Brake controller 28 may comprise a programmable microprocessor or microcontroller or may comprise an application specific integrated circuit (ASIC). Brake controller 28 may include a memory and a central processing unit (CPU). Brake controller 28 may also include an input/output (I/O) interface including a plurality of input/output pins or terminals through which brake controller 28 may receive a plurality of input signals and transmit a plurality of output signals. The input signals may, for example, include signals generated in response to inputs by an operator of vehicle 10 through an operator interface in tractor 12 such as a foot pedal valve or dash control valve indicative of a request to provide service braking in vehicle 10. The signals may also include signals generated by other sensors and systems in vehicle 10 indicative of conditions in which automated braking of vehicle 10 should occur to implement functions such as automated emergency braking (AEB), anti-lock braking (ABS), collision avoidance, adaptive cruise control, traction control or stability control. The output signals may, for example, include control signals for fluid circuit 34 to implement service braking in wheel brakes 30. Brake controller 28 may be configured to communicate with various components of braking system 26 directly using dedicated (hard) wire connections. Alternatively, or in addition, controller 28 may be configured to communicate with one or more components of braking system 26 over a vehicle communications bus implementing a communications network such as a controller area network (CAN) or local interconnect network (LIN) or over a vehicle power line through power line communication (PLC) in accordance with various industry standard protocols including by not limited to SAE J1939, SAEJ1922, ISO 11992 and SAE J2497 or using a proprietary protocol. Brake controller 28 is located on, and/or mounted on, tractor 12 and is configured to transmit electronic control signals to components of braking system 26 on downstream members of vehicle 10, such as semi-trailer 14, through electrical conductors 24.

Wheel brakes 30 are configured to apply a braking force to one or more wheels 20. In the illustrated embodiment, brakes 30 comprise disc brakes in which a carrier supports brake pads on opposite sides of a rotor rotating with the wheel 20 and an actuator causes, responsive to fluid pressure delivered by fluid circuit 34, movement of a caliper relative to the carrier to move the brake pads into and out of engagement with the rotor. Alternatively, wheel brakes 30 may comprise drum brakes in which an actuator such as a cam or piston causes, responsive to fluid pressure delivered by circuit 34, movement of one or more brake shoes into engagement with a braking surface in a brake drum rotating with the wheel 20. Wheel brakes 30 may be configured to function as both a service brake for applying service braking while vehicle 10 is an active state and as a parking brake for applying parking or emergency braking while vehicle 10 is an active or inactive state.

Wheel speed sensors 32 are provided to measure the rotational speed of wheels 20. Sensors 32 may generate signals indicative of the speed of wheels 20 on either side of vehicle 10 and provide those signals to fluid circuit 34 for use in anti-lock braking and stability control.

Fluid circuit 34 generates fluid pressure within braking system 26 and controls the delivery of fluid pressure to the actuator of each wheel brake 30 on trailer 14. Circuit 34 may include components for generating and storing pressurized fluid including fluid reservoir 36 and components for routing and delivering fluid pressure to wheel brakes 30 including fluid conduits 38 and various valves including electro-pneumatic brake control valve 40, select low valve 42, double check valve 4 and quick release valve 46.

Fluid reservoir 36 stores compressed fluid and supplies pressurized fluid to wheel brakes 30 for use in applying wheel brakes 30. Reservoir 36 has a fluid port coupled to electro-pneumatic brake control valve 40.

Fluid conduits 38 are used to transport fluid between reservoir 36, valves 40, 42, 44, 46 and wheel brakes 30. Conduits 38 may be made from conventional metals and/or plastics and have connectors at either end configured to join the conduits 38 to corresponding components of fluid circuit 34.

Electro-pneumatic brake control valve 40 is provided to control delivery of fluid pressure to wheel brakes 30. Valve 40 is located on and/or mounted on semi-trailer 14 and may comprise the valve offered for sale by the applicant Bendix Commercial Vehicle Systems LLC, under the model number TABS-6 Advanced MC. Valve 40 includes a supply port 48, a control port 50, and delivery ports 52, 54, 56, 58. Supply port 48 is in fluid communication with a fluid source, such as reservoir 36, and is configured to receive fluid pressure from reservoir 36. Control port 50 is in fluid communication with a forward fluid coupling 60 on semi-trailer 14 that is configured to receive a fluid control signal from tractor 12 when the operator of vehicle 10 requests service braking through, for example, actuation of a food pedal on a food pedal valve in tractor 12 or an automated braking system on tractor 12 requests service braking to implement automated emergency braking (AEB), anti-lock braking (ABS), collision avoidance, adaptive cruise control, traction control, stability control or similar functions. Delivery ports 52, 54 are in fluid communication with wheel brakes 30 and are configured to deliver fluid pressure to wheel brakes 30 on either side of semi-trailer 14. Delivery ports 56, 58 are in fluid communication with select low valve 42 and are configured to deliver fluid pressure to select low valve 42.

Electro-pneumatic brake control valve 40 is configured with two fluid channels to allow variation in the fluid pressure delivered to the wheel brakes 30 on either side of semi-trailer 14 for implementation of functions such as anti-lock braking and/or stability control. Delivery ports 52, 56 form part of one fluid channel. Delivery ports 54, 58 form part of another fluid channel. Valve 40 includes a pair of relay valves (one for each fluid channel) that deliver fluid pressure from reservoir 36 to wheel brakes 30 and select low valve 42 or exhaust fluid pressure from wheel brakes 30 responsive to a control pressure. The relay valves increase the volume of fluid, and therefore the flow rate, at which fluid is delivered to, and exhausted from, wheel brakes 30 in order to eliminate lag times between the commanded and actual application and release of wheel brakes 30. Valve 40 further includes solenoid valves configured to establish the control pressure and, therefore, control the operation of each relay valve. An electronic control unit in valve 40 controls the operation of the solenoid valves. In accordance with one aspect of the systems disclosed herein, valve 40 is configured to output fluid pressure from a fluid source such as reservoir 36 received at supply port 48 through delivery ports 52, 54, 56, 58 to wheel brakes 30 and select low valve 42 responsive to an electronic control signal that is generated by brake controller 28. The electronic control unit in valve 40 may control the solenoid valves in valve 40 responsive to the electronic control signals from controller 28. When service braking is requested—either by the operator of vehicle 10 or by an automated braking system configured to implement automated emergency braking (AEB), anti-lock braking (ABS), collision avoidance, adaptive cruise control, traction control, stability control or similar functions—controller 28 generates and transmits an electronic control signal to the electronic control unit in valve 40 which in turn controls the solenoid valves to deliver a control pressure to one or both of the relay valves and fluid pressure from reservoir 36 to wheel brakes 30 and select low valve 42. In accordance with another aspect of the systems disclosed herein, the electronic control unit in valve 40 may also control the solenoid valves in response to signals from sensors on semi-trailer 14, such as wheel speed sensors 32, to implement automated braking functions in wheel brakes 30 of semi-trailer 14 (e.g., for stability control) and deliver a control pressure to one or both of the relay valves and fluid pressure from reservoir 36 to wheel brakes 30 and select low valve 42. As a result, valve 40 may provide fluid pressure to wheel brakes 30 and select low valve 42 even in the absence of a control signal from controller 28 and/or provide fluid pressure to wheel brakes 30 and select low valve 42 in excess of the commanded pressure from controller 28. The electronic control unit in valve 40 may also process signals from pressure sensors within valve 40 and from wheel speed sensors 32 and brake lining wear sensors associated with wheels 20 and wheel brakes 30, respectively. Valve 40 may generate signals indicative of fluid pressure, wheel speed and brake lining wear and transmit those signals to controller 28 and other vehicle systems over the communications bus or power line referenced hereinabove.

Select low valve 42 is configured to output the lower of two fluid pressures received by valve 42. Valve 42 includes a supply port 62 in fluid communication with delivery port 56 on electro-pneumatic brake control valve 40 and receives fluid from valve 40 having a first fluid pressure. Valve 42 also includes a supply port 64 in fluid communication with delivery port 58 on valve 40 and receives fluid from valve 40 having a second fluid pressure. In most conditions, the fluid pressure through each channel of valve 40 and, therefore, the first and second fluid pressures received at supply ports 62, 64 of valve 42, will be equal to one another. When certain conditions such as a loss of roll stability exist, however, the fluid pressure in each channel of valve 40 and, therefore, the first and second fluid pressures received at supply ports 62, 64 of valve 42, may vary. Valve 42 prevents transmission of relatively high pressures that may be output through one of the fluid channels in valve 40 under these conditions from being transmitted to double check valve 44 and, ultimately, to downstream members of vehicle 10 to prevent locking of wheels 20 on downstream members of vehicle 10 that may lack anti-lock braking and/or roll stability control functions and/or have uncertain loads. Valve 42 further includes a delivery port 66 that delivers fluid at the lower of the first and second fluid pressures.

Double check valve 44 is configured to generate a fluid control signal that is transmitted from semi-trailer 14 to downstream members of combination vehicle 10 such as semi-trailer 16 and/or dolly 18. In accordance with one aspect of the systems disclosed herein, the fluid control signal may be generated in response to fluid pressure (i) received by semi-trailer 14 from tractor 12 as in conventional fluid-controlled braking systems or (ii) received from electro-pneumatic brake control valve 40 on semi-trailer 14 operating as part of an electronic braking system on tractor 12 and semi-trailer 14. When service braking is requested by an operator of vehicle 10 or an automated braking system on tractor 12, a fluid control signal will be generated and transmitted from tractor 12 to semi-trailer 14 through fluid coupling 60. Controller 28 will also generate an electronic control signal that will be transmitted from tractor 12 to semi-trailer 14 through electrical coupling 68. Because the electronic control signal will reach electro-pneumatic brake control valve 40 more quickly than the fluid control signal, valve 40 will initiate delivery of fluid pressure to wheel brakes 30 on semi-trailer 14 and to select low valve 42 and, indirectly, to double check valve 44 before the fluid control signal is received by either of valves 40, 44. Double check valve 44 will, in turn, generate and transmit a fluid control signal to downstream members of vehicle 10 prior to receiving the fluid control signal from tractor 12 thereby enabling faster application of wheel brakes in any downstream members of vehicle 10 lacking an electronic braking system and which would ordinarily have to await propagation of the fluid control signal from tractor 12. In addition, in situations in which electro-pneumatic brake control valve 40 itself implements automated emergency braking of wheel brakes 30 on trailer 14 (e.g., for stability control), this brake request may also be transmitted to downstream members of vehicle 10. Because double-check valve 44 delivers the greater of the fluid pressure from fluid coupling 60 and electro-pneumatic brake control valve 40, double-check valve 44 nevertheless ensures that any higher-pressure brake requests from the operator or an automated braking system on tractor 12 will be honored (e.g., in situations where electro-pneumatic brake control valve 40 malfunctions or otherwise attempts to deliver a fluid pressure to wheel brakes 30 that is less than the fluid pressure commanded by the operator of vehicle 10).

Double check valve 44 may comprise the valve offered for sale by the applicant Bendix Commercial Vehicle Systems LLC, under the model number DC-4. Valve 44 includes supply ports 70, 72 and a delivery port 74. Supply port 70 is in fluid communication with forward fluid coupling 60 on semi-trailer 14 that is configured to deliver a fluid control signal transmitted from tractor 12 to semi-trailer 14 when the operator of vehicle 10 requests service braking through an operator interface in vehicle 10 such as a foot pedal valve on tractor 12 or an automated braking system on tractor 12 requests service braking. Supply port 72 is in fluid communication with delivery port 66 of select low valve 42 and, indirectly, delivery ports 56, 58 of electro-pneumatic brake control valve 40 and is therefore configured to receive fluid pressure from select low valve 42 and, indirectly, electro-pneumatic brake control valve 40. Delivery port 74 is in fluid communication with a rear fluid coupling 76 on semi-trailer 14 (through quick release valve 46) and is configured to deliver a fluid control signal from valve 44 on semi-trailer 14 to downstream members of vehicle 10 such as semi-trailer 16 and dolly 18.

Quick release valve 46 transmits fluid pressure from double check valve 44 to rear fluid coupling 76. In the absence of fluid pressure from double check valve 44, quick release valve 46 exhausts fluid pressure from the fluid hose extending from coupling 76. Valve 46 may comprise the valve offered for sale by the applicant Bendix Commercial Vehicle Systems LLC, under the model number QR-1. Valve 46 has a supply port in fluid communication with delivery port 74 of double-check valve 44, a delivery port in fluid communication with rear fluid coupling 76, and an exhaust port. In the presence of fluid pressure at the supply port of valve 46, the supply port and delivery port of valve 46 are in fluid communication and valve 46 passes the fluid pressure to the delivery port. In the absence of fluid pressure at the supply port of valve 46, the delivery port and exhaust port of valve 46 are in fluid communication and fluid is exhausted through the exhaust port. Although a quick release valve 46 is shown in the illustrated embodiment, it should be understood that alternative structures capable of providing the same functionality, such as a relay valve, could be used in place of quick release valve 46. It will also be understood by those of skill in the art that the configuration of double check valve 44 and quick release valve 46 show in the illustrated embodiment could be modified in a variety of ways. For example, it is possible to locate quick release valve 46 upstream of double check valve 44 (as opposed to downstream of double check valve 44 as shown in FIG. 2). It is also possible to combine the functionality of valves 44, 46 into a single valve assembly.

Figure 3:
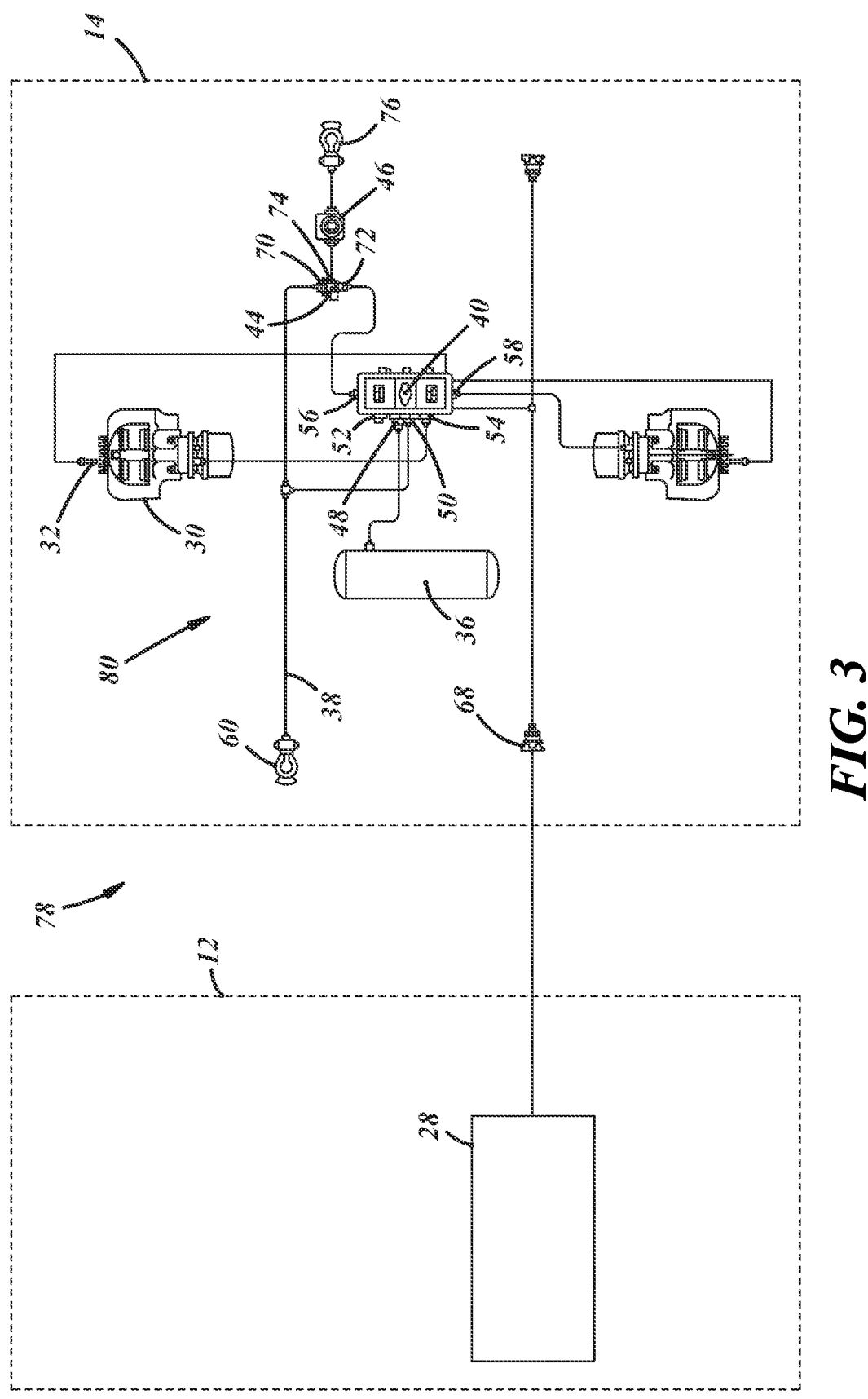
FIG. 3 is a diagrammatic view of another embodiment of a service brake control system for a combination vehicle in accordance with the teachings set forth herein.

Referring now to FIG. 3, another embodiment of a system 78 for controlling braking of vehicle 10 and, in particular, controlling servicing braking of vehicle 10 is illustrated. System 78 is substantially similar to system 26 and a discussion of similar components in systems 26 and 78 may be found hereinabove. System 78 differs from system 26 in that system 78 includes a different fluid circuit 80 relative to fluid circuit 34 of system 26. Fluid circuit 80 does not include the select low valve 42 found in fluid circuit 34 of system 26. In addition, fluid circuit 80 alters the flow of fluid within the fluid circuit relative to fluid circuit 34 of system 26. In particular, supply port 72 of double check valve 44 is in direct fluid communication with delivery port 56 of electro-pneumatic brake control valve 40 while wheel brakes 30 are in fluid communication with delivery ports 54, 58 of electro-pneumatic brake control valve 40. As a result, fluid pressure is delivered to wheel brakes 30 through one fluid channel of electro-pneumatic brake control valve 40 while fluid pressure is delivered to double-check valve 44 through a second fluid channel of electro-pneumatic brake control valve 40. This arrangement allows for a less complex fluid circuit in towed members of vehicle 10 when separating fluid control of wheel brakes 30 on either side of the member for anti-lock braking and/or stability control is not required. The arrangement also enables configuration of the fluid pressures sent to downstream members of vehicle 10 without accommodating for specific fluid pressure requirements of wheel brakes 30. As a result, for example, different fluid pressures can be sent to downstream members of vehicle 10 for improved stability control. Due to the differences in the fluid circuit 80 in system 78, the electronic control unit in valve 40 of fluid circuit 80 would be configured differently (i.e., would execute a different set of programming instructions (software)) than the electronic control unit in valve 40 of fluid circuit 34.

Figure 4:
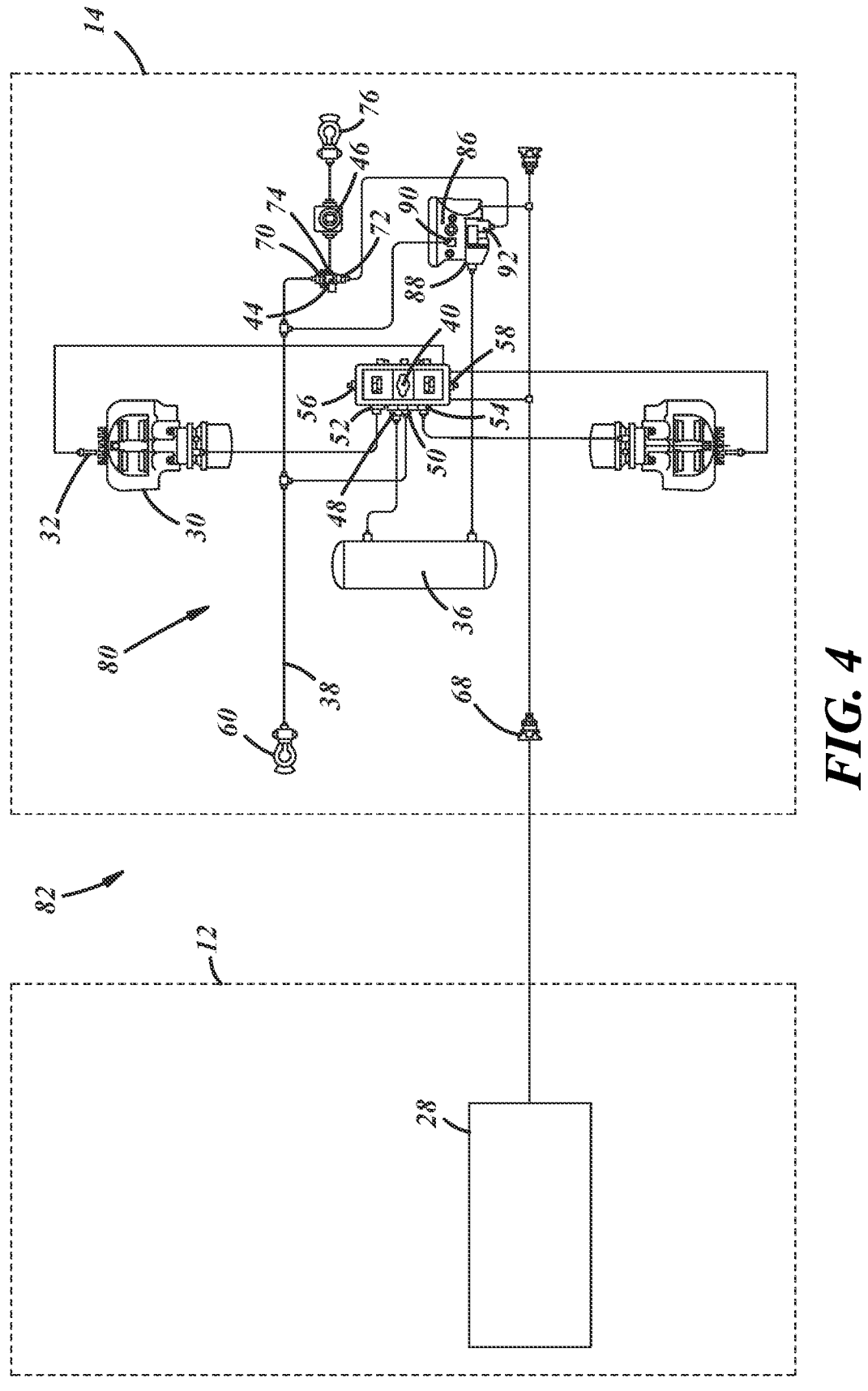
FIG. 4 is a diagrammatic view of another embodiment of a service brake control system for a combination vehicle in accordance with the teachings set forth herein.

Referring now to FIG. 4, another embodiment of a system 82 for controlling braking of vehicle 10 and, in particular, controlling servicing braking of vehicle 10 is illustrated. System 82 is substantially similar to system 26 and a discussion of similar components in systems 26 and 82 may be found hereinabove. System 82 differs from system 26 in that system 82 includes a different fluid circuit 84 relative to fluid circuit 34 of system 26. In particular, fluid circuit 84 does not include the select low valve 42 found in fluid circuit 34 of system 26, but fluid circuit 84 adds an additional electro-pneumatic brake control valve 86 and places a delivery port of this valve 86 (as opposed to any of the delivery ports on valve 40) in fluid communication with supply port 72 of double check valve 44.

Electro-pneumatic brake control valve 86 controls delivery of fluid pressure to supply port 72 on double check valve 44 and is located on and/or mounted on semi-trailer 14. Electro-pneumatic brake control valve 86 is similar to electro-pneumatic brake control valve 40 described hereinabove, but may be configured with only one relay valve and provide only one fluid channel. Valve 86 includes a supply port 88, a control port 90, and a delivery port 92. Supply port 88 is in fluid communication with a fluid source, such as reservoir 36, and is configured to receive fluid pressure from reservoir 36. Control port 90 is in fluid communication with forward fluid coupling 60 on semi-trailer 14 that is configured to receive a fluid control signal from tractor 12 when the operator of vehicle 10 requests service braking through, for example, actuation of a foot pedal on a food pedal valve in tractor 12 or an automated braking system on tractor 12 requests service braking in vehicle 10. Delivery port 92 is in fluid communication with supply port 72 of double check valve 44 and is configured to deliver fluid pressure to supply port 72 of double check valve 44. Elector-pneumatic brake control valve 86 is again configured to output fluid pressure from a fluid source such as reservoir 36 received at supply port 88 through delivery port 92 responsive to electronic control signals generated by brake controller 28 on tractor 12. An electronic control unit in valve 86 controls the operation of the solenoid valves in valve 86 that in turn control the relay valve in valve 86 responsive to the electronic control signals from brake controller 28. When service braking is requested-either by the operator of vehicle 10 or by an automated braking system configured to implement automated emergency braking (AEB), anti-lock braking (ABS), collision avoidance, adaptive cruise control, stability control or similar functions-brake controller 28 generates and transmits an electronic control signal to the electronic control unit in valve 86 which in turn controls the solenoid valves to deliver a control pressure to the relay valves and deliver fluid pressure from reservoir 36 to supply port 72 of double check valve 44. This action causes double check valve 44 to generate and transmit a fluid control signal through quick release valve 46 and rear fluid coupling 76. Because the electronic control signal received by valve 86 from brake controller 28 is transmitted more rapidly than a fluid control signal through forward fluid coupling 60, system 82 is again able to accelerate delivery of fluid control signals to downstream members of vehicle 10 that do not include electronic braking systems.

A service brake control system 26, 78 or 82 for a combination vehicle 10 in accordance with the teachings disclosed herein is advantageous relative to conventional systems. In particular, the system 26, 78 or 82 accelerates the transmission of fluid control signals to members of the combination vehicle 10 using conventional fluid-controlled braking systems by taking advantage of the faster electrical control signals received by members of the combination vehicle 10 using electronic braking systems. Further, the system 26, 78 or 82 does so without comprising the conventional fluid-controlled operation of the fluid-controlled braking systems. As a result, the system 26, 78 or 82 shortens the response time between a brake command and application of wheel brakes 30 on members of the combination vehicle 10 employing fluid-controlled braking systems (particularly on towed members further away from the towing member) and enables improved synchronization in the operation of wheel brakes 30 on the members of the combination vehicle 10.

While the invention has been shown and described with reference to one or more particular embodiments thereof, it will be understood by those of skill in the art that various changes and modifications can be made without departing from the spirit and scope of the invention.

What is claimed is:

1. A service brake control system for a combination vehicle including a towing member and first and second towed members, comprising:

a first electro-pneumatic brake control valve configured for mounting on the first towed member and configured to output fluid pressure from a fluid source received at a supply port on the first electro-pneumatic brake control valve through a first delivery port on the first electro-pneumatic brake control valve responsive to an electronic control signal that is generated by a brake controller on the towing member; and, a double check valve having a first supply port in fluid communication with a forward fluid coupling on the first towed member that is configured to deliver a first fluid control signal from the towing member to the first towed member, a second supply port configured for fluid communication with the first delivery port of the first electro-pneumatic brake control valve and a delivery port in fluid communication with a rear fluid coupling on the first towed member and configured to deliver a second fluid control signal from the double check valve on the first towed member to the second towed member.

2. The system of claim 1 wherein the first electro-pneumatic brake control valve further includes a control port in fluid communication with the forward fluid coupling on the first towed member and configured to receive the first fluid control signal.

3. The system of claim 1, further comprising a second electro-pneumatic brake control valve configured for mounting on the first towed member and configured to output fluid pressure from the fluid source to a wheel brake on the first towed member responsive to the electronic control signal.

4. The system of claim 3 wherein the first electro-pneumatic brake control valve further includes a control port in fluid communication with the forward fluid coupling on the first towed member and configured to receive the first fluid control signal and the second electro-pneumatic brake control valve includes a control port in fluid communication with the forward fluid coupling on the first towed member and configured to receive the first fluid control signal.

5. The system of claim 1 wherein the first electro-pneumatic brake control valve is configured to deliver fluid pressure from the fluid source to a first wheel brake on the first towed member responsive to the electronic control signal.

6. The system of claim 5 wherein the first electro-pneumatic brake control valve delivers fluid pressure to the first wheel brake on the first towed member through a second delivery port on the first electro-pneumatic brake control valve.

7. The system of claim 6 wherein the first delivery port on the first electro-pneumatic brake control valve is part of a first fluid channel and the second delivery port on the first electro-pneumatic brake control valve is part of a second fluid channel, different from the first fluid channel.

8. The system of claim 7 wherein the first electro-pneumatic brake control valve is configured to deliver fluid pressure from the fluid source to a second wheel brake on the first towed member responsive to the electronic control signal through a third delivery port on the first electro-pneumatic brake control valve.

9. The system of claim 8 wherein the third delivery port on the first electro-pneumatic brake control valve is part of the second fluid channel.

10. The system of claim 6 wherein the first and second delivery ports on the first electro-pneumatic brake control valve are part of a first fluid channel.

11. The system of claim 10 wherein the first electro-pneumatic brake control valve is configured to deliver fluid pressure from the fluid source to a second wheel brake on the first towed member responsive to the electronic control signal through a third delivery port on the first electro-pneumatic brake control valve, the third delivery port part of a second fluid channel.

12. The system of claim 1, further comprising a select low valve having a first supply port in fluid communication with the first delivery port on the first electro-pneumatic brake control valve and configured to receive a first fluid pressure, a second supply port in fluid communication with a second delivery port on the first electro-pneumatic brake control valve and configured to receive a second fluid pressure, and a delivery port in fluid communication with the second supply port of the double check valve and configured to output a lower of the first fluid pressure and the second fluid pressure.

13. The system of claim 12 wherein the first electro-pneumatic brake control valve is configured to deliver fluid pressure from the fluid source to a first wheel brake on the first towed member through a third delivery port on the first electro-pneumatic brake control valve responsive to the electronic control signal.

14. The system of claim 13 wherein the first and third delivery ports on the first electro-pneumatic brake control valve are part of a first fluid channel.

15. The system of claim 14 wherein the first electro-pneumatic brake control valve is configured to deliver fluid pressure from the fluid source to a second wheel brake on the first towed member through a fourth delivery port on the first electro-pneumatic brake control valve responsive to the electronic control signal.

16. The system of claim 15 wherein the second and fourth delivery ports on the first electro-pneumatic brake control valve are part of a second fluid channel, different from the first fluid channel.

* * * * *